(12) United States Patent
Hajji

(10) Patent No.: US 7,093,157 B2
(45) Date of Patent: Aug. 15, 2006

(54) METHOD AND SYSTEM FOR AUTONOMIC PROTECTION AGAINST DATA STRIP LOSS

(75) Inventor: Amine M. Hajji, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 10/870,806

(22) Filed: Jun. 17, 2004

(65) Prior Publication Data

US 2005/0279837 A1 Dec. 22, 2005

(51) Int. Cl.
*G06F 11/00* (2006.01)
(52) U.S. Cl. ......................................... 714/5
(58) Field of Classification Search ............... 711/114, 711/162, 170, 203, 118; 717/168; 235/380; 714/5–10, 764, 800; 702/185
See application file for complete search history.

(56) References Cited

U.S. PATENT DOCUMENTS

| 5,265,098 | A | 11/1993 | Mattson et al. |
| 5,392,290 | A | 2/1995 | Brown et al. |
| 5,537,567 | A | 7/1996 | Galbraith et al. |
| 5,666,512 | A | 9/1997 | Nelson et al. |
| 5,737,344 | A | 4/1998 | Belser et al. |
| 5,896,493 | A | 4/1999 | Rao |
| 5,974,503 | A | 10/1999 | Venkatesh et al. |
| 5,991,411 | A * | 11/1999 | Kaufman et al. ........... 235/380 |

(Continued)

FOREIGN PATENT DOCUMENTS

JP 2000039970 2/2000

OTHER PUBLICATIONS

Lee et al., U.S. Appl. No. US2003/0120869A1, publication date Jun. 26, 2003.

(Continued)

*Primary Examiner*—Thien M. Le
*Assistant Examiner*—Thien T. Mai
(74) *Attorney, Agent, or Firm*—Timothy N. Ellis

(57) ABSTRACT

One aspect of the invention is a method for providing protection from data loss on a storage device. An example of the method includes designating a number n, and identifying a plurality of groups of strips on the storage device, wherein a number of strips in a plurality of the groups is equal to the number n. This example also includes reserving a respective parity protection strip on the storage device, for a plurality of the groups of strips identified on the storage device. This example further includes calculating a parity value for a plurality of parity protection strips on the storage device, wherein each calculated parity value is a function of information stored in each of the strips in the corresponding group of strips. This example additionally includes storing the calculated parity protection strip parity values, in corresponding parity protection strips.

26 Claims, 9 Drawing Sheets

U.S. PATENT DOCUMENTS

| | | |
|---|---|---|
| 5,991,804 A | 11/1999 | Bolosky et al. |
| 6,023,780 A | 2/2000 | Iwatani |
| 6,101,615 A | 8/2000 | Lyons |
| 6,138,125 A | 10/2000 | DeMoss |
| 6,219,752 B1 * | 4/2001 | Sekido ........................ 711/114 |
| 6,253,300 B1 | 6/2001 | Lawrence et al. |
| 6,321,345 B1 | 11/2001 | Mann et al. |
| 6,353,895 B1 | 3/2002 | Stephenson |
| 6,513,093 B1 | 1/2003 | Chen et al. |
| 6,526,478 B1 * | 2/2003 | Kirby ........................ 711/114 |
| 6,792,391 B1 * | 9/2004 | Nanda ........................ 702/185 |
| 2003/0231183 A1 * | 12/2003 | Ning et al. .................. 345/564 |
| 2003/0236944 A1 * | 12/2003 | Thompson et al. ......... 711/114 |
| 2004/0190183 A1 * | 9/2004 | Tamai et al. .................. 360/69 |
| 2005/0155029 A1 * | 7/2005 | Nguyen et al. ............. 717/168 |

OTHER PUBLICATIONS

"Hybrid Reducdancy Direct-Access Storage Device Array with Design Options", IBM Technical Disclosure Bulletin, Feb. 1994, pp. 141-148, vol. 37, No. 02B, IBM Corporation, Armonk.

* cited by examiner

First Disk
Parity Strip

Second Disk
Data Strip 1
Bad Sector

Third Disk
Data Strip 2

Fourth Disk
Data Strip 3
Failed Disk Drive

| Member Disk 1 | Member Disk 2 | Member Disk 3 |
|---|---|---|
| RPS10 | Strip 20 | Strip 30 |
| RPS11 | Strip 21 | Strip 31 |
| Strip 12 | RPS22 | Strip 32 |
| Strip 13 | RPS23 | Strip 33 |
| Strip 14 | Strip 24 | RPS34 |
| Strip 15 | Strip 25 | RPS35 |
|  |  |  |
| RPS 1(N-1) | Strip 2(N-1) | Strip 3(N-1) |
| Array Metadata + PPS Strips | Array Metadata + PPS Strips | Array Metadata + PPS Strips |

FIG. 7

METHOD AND SYSTEM FOR AUTONOMIC PROTECTION AGAINST DATA STRIP LOSS

BACKGROUND

1. Technical Field

The present invention relates to providing protection from data loss on a storage device. More particularly, some examples of the invention concern providing protection from data loss on a storage device by calculating a parity value as a function of information stored on a plurality of strips on the storage device.

2. Description of Related Art

Important data is often stored in storage devices in computing systems. Because storage devices can fail and data in failed storage devices can be lost, techniques have been developed for preventing data loss and for restoring data when one or more storage devices fail.

One technique for preventing data loss comprises storing parity information on a storage device (such as a disk drive), which is a member of a storage array, and storing data on one or more of the other storage devices in the array. (Herein a disk drive may be referred to as a "disk".) With this technique, if a storage device fails, parity information can be used to reconstruct the data that was on the failed storage device. Moreover, if sufficient parity information is added to another storage device, the additional parity information may be used to reconstruct data stored on more than one failed storage device. Another technique for preventing data loss, called data mirroring, comprises making a duplicate copy of data on a separate storage device. With this technique, if a storage device fails, data can be restored from the copy of the data.

A Redundant Array of Inexpensive (or Independent) Disks (RAID), may be used to provide a data storage system that has increased performance and capacity. Data mirroring and parity information storage, or a combination of the two, may be implemented on a RAID array to provide data protection. Also, a technique called striping may be utilized, wherein data records and parity information are divided into strips such that the number of strips equals the number of disks in the array. Each strip is written or "striped" to each of the different disks in the RAID array, to balance the load across the disks and to improve performance. A group of strips comprising one pass across all of the drives in a RAID is called a stride. Several RAID protocols have been devised, wherein different mirroring, parity, and striping arrangements are employed. As an example, in a RAID 5 array consisting of six disks, five data strips and one parity strip are striped across the six disks, with the parity information rotated across the disks. The rotation of the parity across the disks ensures that parity updates to the array are shared across the disks. RAID 5 provides a redundancy of one, which means that all data can be recovered if any one and only one of the disks in the array fails.

A type of data loss known as a strip loss can occur during a RAID rebuild after an array has had one or more disk drive failures, when the total number of disk drive failures is equal to the disk drive fault tolerance of the RAID code. For example, with RAID 5, a rebuild of lost data on a spare disk drive may be accomplished as long as no more than 1 disk drive fails. Strip loss occurs during the rebuild of a RAID 5 array if any media error occurs when trying to read the strips in any one of the surviving drives. This is because the rebuild process requires reading each of the strips from the remaining drives and using parity reconstruction to recover the lost data. Because there is no redundancy remaining in a RAID 5 disk array after the first disk drive failure, the media error effectively prevents the full recovery of the original data stride. In higher RAID codes (such as RAID DP and RAID 51), the exposure to a strip loss occurs when 2 or more (e.g. 2 for RAID DP and 3 for RAID 51) disk drive failures have occurred and a media error is encountered during the rebuild on the surviving array disks.

A known solution to this problem is to provide additional RAID fault tolerance by using higher RAID codes. These higher codes require a substantial increase in the number of disk drives, or alternately are achieved at a significant loss in effective capacity. For example, a user may opt to go from a 5 disk RAID 5 array to a 10 disk RAID 51 array wherein the RAID 5 array is mirrored. As another example, the storage efficiency for a RAID 6 array, for the same data storage capacity as a RAID 5 array, is lower than the RAID 5 array because a RAID 6 array requires an additional disk. RAID 6 has an arrangement similar to RAID 5, but requires two parity strips in each stride, to provide a redundancy of two.

Retrieving a strip from a drive that may have a poorly written track or some other localized problem (e.g. excessive off-track disturbance at a particular physical location on the drive), frequently causes the device adapter to resort to a preemptive reconstruct of the data, and often requires an undesirably long period of time. A preemptive reconstruct occurs when the RAID adapter times out the target disk drive for being too slow in its data recovery process (DRP) attempts. The RAID adapter may then reconstruct the target strip using the remaining array members and parity. This reconstruction of the target strip requires reading each strip in the same stride as the target strip, from the other array disk drives, and XORing them to recover the target strip. This reconstruction can take a significant amount of time to complete.

In the extreme case where a drive repeatedly times out in attempting to read from a particular location, the adapter or host may permanently fence the drive from the array and request service to replace it with a spare disk drive. In that situation the array is exposed to strip loss until the spare drive is brought on line and the rebuild is successfully completed.

A known solution to the exposure to possible strip loss is to use a mirror scheme to allow the target strip to be read quickly from the mirror image, in lieu of reconstructing the target strip as described above. However, mirroring is accomplished at the expense of halving the effective capacity of the RAID array, or equivalently, doubling the cost of storage.

In summary, known techniques for recovering or reconstructing unreadable target strips often have significant shortcomings.

SUMMARY

One aspect of the invention is a method for providing protection from data loss on a storage device. An example of the method includes designating a number n, and identifying a plurality of groups of strips on the storage device, wherein a number of strips in a plurality of the groups is equal to the number n. This example also includes reserving a respective parity protection strip on the storage device, for a plurality of the groups of strips identified on the storage device. This example further includes calculating a parity value for a plurality of parity protection strips on the storage device, wherein each calculated parity value is a function of information stored in each of the strips in the corresponding group of strips. This example additionally includes storing the calculated parity protection strip parity values, in corresponding parity protection strips.

Other aspects of the invention are described in the sections below, and include, for example, a storage system, and a signal bearing medium tangibly embodying a program of machine-readable instructions executable by a digital processing apparatus to perform operations for providing protection from data loss on a storage device.

Some examples of the invention provide protection from data loss during the rebuild of a storage device in an array of storage devices. Also, some examples of the invention efficiently use available storage to provide the protection from data loss. Also, some examples of the invention provide fast reconstruction of data if a storage device has a media error, without having to perform a storage device's data recovery process (DRP), and without reading information from other storage devices in a storage device array. Because some examples of the invention provide fast reconstruction of data, these examples of the invention significantly reduce storage device array rebuild time after one or more drive failures, thereby providing additional robustness against data loss during a rebuild. The invention also provides a number of other advantages and benefits, which should be apparent from the following description.

BRIEF DESCRIPTION OF THE DRAWINGS

FIG. 7 is a depiction of strips on an array of disk drives in accordance with an example of the invention.

DETAILED DESCRIPTION

Figure 1:
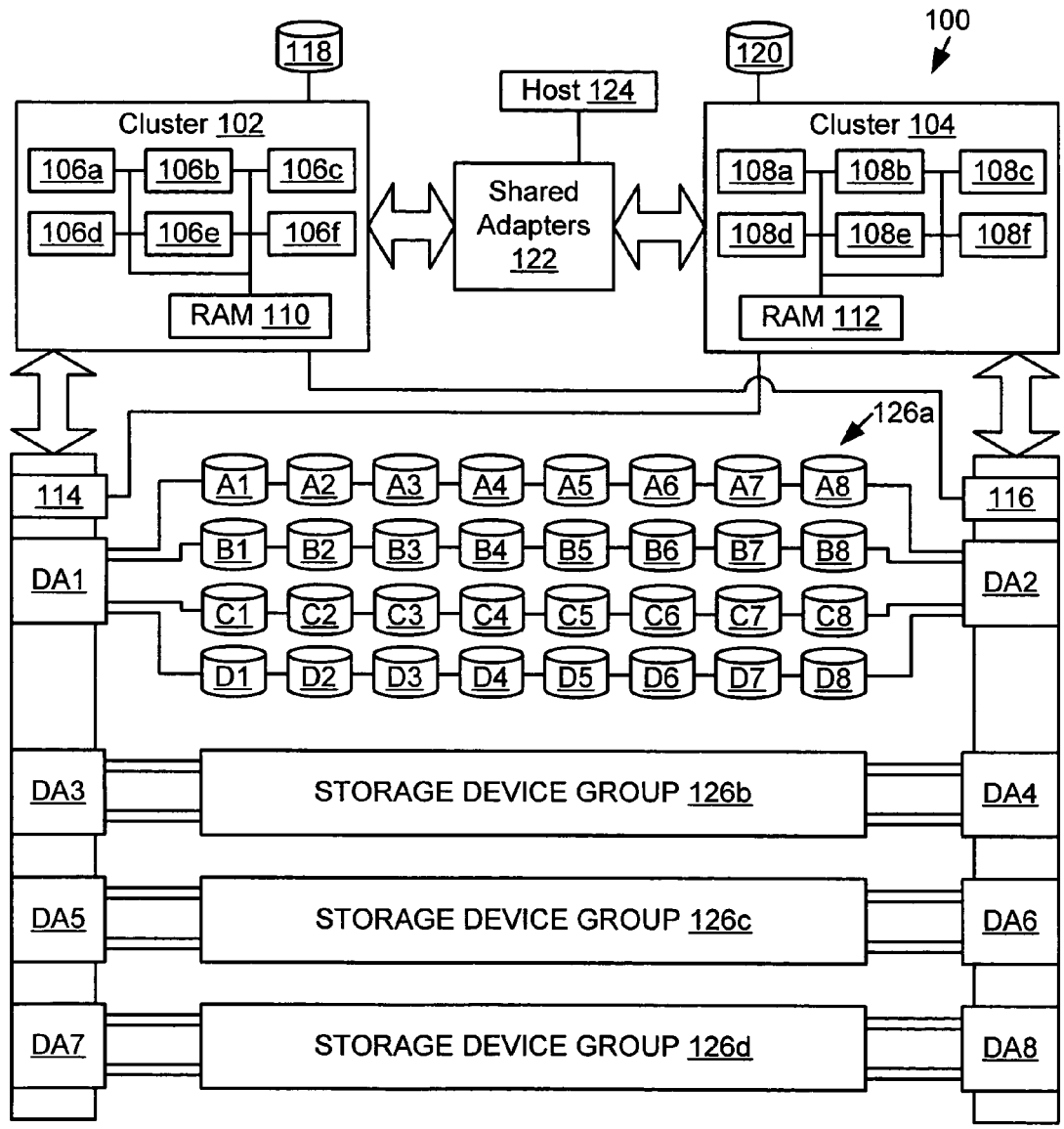
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system that provides protection from data loss on a storage device. As an example, the computing system may be embodied by all, or portions of, the computing system 100 shown in FIG. 1. In some embodiments, the computing system 100 may include a model 800 Enterprise Storage Server (ESS), manufactured by International Business Machines Corporation.

The computing system 100 includes a first cluster 102, and a second cluster 104. In alternative embodiments, the computing system 100 may have a single cluster or more than two clusters. Each cluster has at least one processor. As an example, each cluster may have four or six processors. In the example shown in FIG. 1, the first cluster 102 has six processors 106a, 106b, 106c, 106d, 106e, and 106f, and the second cluster 104 also has six processors 108a, 108b, 108c, 108d, 108e, and 108f. Any processors having sufficient computing power may be used. As an example, each processor 106a–f, 108a–f, may be a PowerPC RISC processor, manufactured by International Business Machines Corporation. The first cluster 102 also includes a first memory 110, and similarly, the second cluster 104 includes a second memory 112. As an example, the memories 110, 112, may be RAM. The memories 110, 112 may be used to store, for example, data, and application programs and other programming instructions executed by the processors 106a–f, 108a–f. The two clusters 102, 104 may be located in a single enclosure or in separate enclosures. In alternative embodiments, each cluster 102, 104 could be replaced with a supercomputer, a mainframe computer, a computer workstation, and/or a personal computer.

The first cluster 102 is coupled to NVRAM 114 (nonvolatile random access memory), which is included with a first group of device adapters DA1, DA3, DA5, DA7 (discussed below). Similarly, the second cluster 104 is coupled to NVRAM 116, which is included with a second group of device adapters DA2, DA4, DA6, DA8 (discussed below). Additionally, the first cluster 102 is coupled to the NVRAM 116, and the second cluster 104 is coupled to the NVRAM 114. As an example, data operated on by cluster 102 is stored in memory 110, and is also stored in NVRAM 116, so that if cluster 102 becomes unoperational, the data will not be lost and can be operated on by cluster 104. Similarly, as an example, data operated on by cluster 104 is stored in memory 112, and is also stored in NVRAM 114, so that if cluster 104 becomes unoperational, the data will not be lost and can be operated on by cluster 102. The NVRAM 114, 116 may, for example, be able to retain data for up to about 48 hours without power.

Within the first cluster 102, two or more of the processors 106a–f may be ganged together to work on the same tasks. However, tasks could be partitioned between the processors 106a–f. Similarly, within the second cluster 104, two or more of the processors 108a–f may be ganged together to work on the same tasks. Alternatively, tasks could be partitioned between the processors 108a–f. With regard to the interaction between the two clusters 102, 104, the clusters 102, 104 may act on tasks independently. However, tasks could be shared by the processors 106a–f, 108a–f in the different clusters 102, 104.

The first cluster 102 is coupled to a first boot device, for example first hard drive 118. Similarly, the second cluster 104 is coupled to a second boot device, for example second hard drive 120.

Each of the clusters 102, 104 is coupled to shared adapters 122, which are shared by the clusters 102, 104. The shared adapters 122 can also be called host adapters. The shared adapters 122 may be, for example, PCI slots, and bays hooked to PCI slots, which may be operated by either cluster 102, 104. As an example, the shared adapters 122 may be SCSI, ESCON, FICON, or Fiber Channel adapters, and may facilitate communications with one or more PCs and/or other hosts, such as host 124. As an example, host 124 may be a zSeries server, or a Netfinity server, available from IBM Corporation.

Additionally, the first cluster 102 is coupled to a first group of device adapters DA1, DA3, DA5, DA7, (which may also be called dedicated adapters), and the second cluster 104 is coupled to a second group of device adapters DA2, DA4, DA6, DA8. Each of the device adapters DA1, DA3, DA5, DA7 is an interface between the first cluster 102 and one of the storage device groups 126a, 126b, 126c, 126d, and similarly, each of the device adapters DA2, DA4, DA6, DA8 is an interface between the second cluster 104 and one of the storage device groups 126a, 126b, 126c, 126d. More specifically, device adapters DA1 and DA2 are coupled to storage device group 126a, device adapters DA3 and DA4 are coupled to storage device group 126b, device adapters DA5 and DA6 are coupled to storage device group 126c, and device adapters DA7 and DA8 are coupled to storage device group 126d. In other embodiments, larger or smaller numbers of device adapters DA1–8, and storage device groups 126a–d could be used. The storage device groups 126a–d are shared by the clusters 102, 104. In alternative embodiments, one or more of the storage device groups could be located at a different site than the first cluster 102 and the second cluster 104.

As an example, each (storage) device adapter DA1–8 may be a Serial Storage Architecture (SSA) adapter. Alternatively, one or more of the device adapters DA1–8 could be implemented with other types of adapters, for example SCSI or Fiber Channel adapters. Each adapter DA1–8 may include software, firmware, and/or microcode, for carrying out one or more examples of the invention or portions of the invention. As an example, Common Parts Interconnect (CPI) may be used to couple each device adapter DA1–8 to a respective cluster 102, 104.

Each pair of device adapters (DA1 and DA2, DA3 and DA4, DA5 and DA6, DA7 and DA8), is coupled to two loops of storage devices. Each storage device will typically include a storage controller. The storage controller for each storage device may include software, firmware, and/or microcode, for carrying out one or more examples of the invention or portions of the invention. Device adapters DA1 and DA2, for example, are coupled to a first loop of storage devices that includes a first string of storage devices A1, A2, A3, A4, A5, A6, A7, A8, and a second string of storage devices B1, B2, B3, B4, B5, B6, B7, B8. The first and second strings of storage devices in a loop will usually have the same number of storage devices, to keep the loop balanced. Similarly, device adapters DA1 and DA2 are also coupled to a second loop of storage devices that includes a first string of storage devices C1, C2, C3, C4, C5, C6, C7, C8, and a second string of storage devices D1, D2, D3, D4, D5, D6, D7, D8. A collection of eight storage devices such as storage devices A1, A2, A3, A4, A5, A6, A7, and A8 may be referred to as an 8-pack. Although not required, a loop will generally have a minimum of sixteen storage devices. In alternative embodiments, larger or smaller numbers of storage devices could be included in each loop. For example, thirty-two, forty-eight, or other numbers of storage devices could be included in each loop. Usually, the strings of storage devices in a loop have equal numbers of storage devices. Each loop of storage devices forms a serial loop with each device adapter that the loop of storage devices is coupled to. For example, the loop of storage devices that includes storage devices A1, A2, A3, A4, A5, A6, A7, A8, and B1, B2, B3, B4, B5, B6, B7, B8 forms a serial loop with device adapter DA1, and also forms a serial loop with device adapter DA2. This arrangement increases reliability because each serial loop provides redundant communication paths between each storage device in the loop and each device adapter coupled to the loop.

The storage devices within each group of storage devices 126a, 126b, 126c, 126d may be grouped into one or more storage device arrays, each of which may be, for example, a Redundant Array of Inexpensive (or Independent) Disks (RAID). RAID arrays may also be called RAID ranks. Responsive to read and write requests received from the first and second clusters 102, 104, (or from host 124), the (storage) device adapters DA1–8 are able to individually address each storage device in the RAID arrays to which they are coupled. The storage devices in a particular RAID array may be in the same loop, or in different loops, between a pair of device adapters. As an example where RAID arrays are made from storage devices that are in a single loop, a first RAID array may include storage devices A1, A2, A3, A4, B1, B2, and B3, and a second RAID array may include storage devices A6, A7, A8, B5, B6, B7, and B8, with storage devices B4 and A5 designated as spares that can be used by either RAID array. In this example, each RAID array includes storage devices from the A1, A2, A3, A4, A5, A6, A7, A8, 8-pack, and from the B1, B2, B3, B4, B5, B6, B7, B8, 8-pack, so that each RAID array is close to one of the device adapters DA1, DA2. As an example where RAID arrays are made from storage devices that are in different loops, a first RAID array may include storage devices A1, A2, B1, B2, C1, C2, and D1, a second RAID array may include storage devices A3, A4, B3, B4, C3, D3, and D4, a third RAID array may include storage devices A5, A6, B6, C5, C6, D5, and D6, and a fourth RAID array may include storage devices A8, B7, B8, C7, C8, D7, and D8, with storage devices D2, C4, B5, and A7 designated as spares that can be used by any of the four RAID arrays. In these examples, RAID arrays and spare storage devices that are available for the RAID arrays, are coupled to the same pair of device adapters. However, a RAID array, and spare storage devices that are available for the RAID array, could be coupled to different pairs of device adapters. Also, a RAID array and spare storage devices that are available for the RAID array may be in a single loop, or in different loops.

Data, and if desired, parity information, may be stored on the storage devices of a RAID array in any desired arrangement, which may include striping and/or mirroring across all, or some, of the storage devices in a RAID array. As an example, six storage devices in a RAID array may be used to store data, and a seventh storage device in the RAID array may be used to store parity information. In another example, seven storage devices in a RAID array may be used to store data, and an eighth storage device in the RAID array may be used to store parity information. As another example, both data and parity information may be stored on all of the storage devices in a RAID array. In other embodiments RAID arrays could have less than seven, or more than eight storage devices. For example, a RAID array could consist of five or six storage devices that are each used to store both data and parity information. Also, double parity information may be stored to permit recovery from a second storage device failure that occurs before completing a rebuild after a first storage device failure. For example, a RAID array could consist of six storage devices that are used to store data, and two storage devices that are used to store parity information. As another example, seven storage devices could be used for data, another seven storage devices could be used to mirror the data on the first seven storage devices, and two more storage devices could be used to store parity information, which all together could provide for recovery from the failure of nine storage devices (a failure tolerance of nine).

The storage devices in the storage device groups 126a–d generally may be any suitable devices for storing data, and may use magnetic, optical, magneto-optical, electrical, or any other suitable technology for storing data. For example, the storage devices could be hard disk drives, optical disks or discs (for example, CD-R, CD-RW, WORM, DVD-R, DVD+R, DVD-RW, or DVD+RW), floppy disks, magnetic data storage disks or diskettes, magnetic tape, digital optical tape, EPROMs, EEPROMs, or flash memory. The storage devices do not each have to be the same type of device or use the same type of technology. As an example, each storage device may be a hard drive, having a capacity, for example, of 146 Giga Bytes. In one example, each storage device group 126a–d may be a storage enclosure in a model 2105 Enterprise Storage Server, manufactured by International Business Machines Corporation.

The first cluster 102 and/or the second cluster 104 together with at least one device adapter DA1–8 and at least a portion of at least one storage device group 126a–d may be referred to as a computing system. One or more device adapters DA1–8, with or without a portion of at least one storage device group 126a–d, may also be referred to as a computing system. A storage device controller may also be called a computing system.

Figure 2:
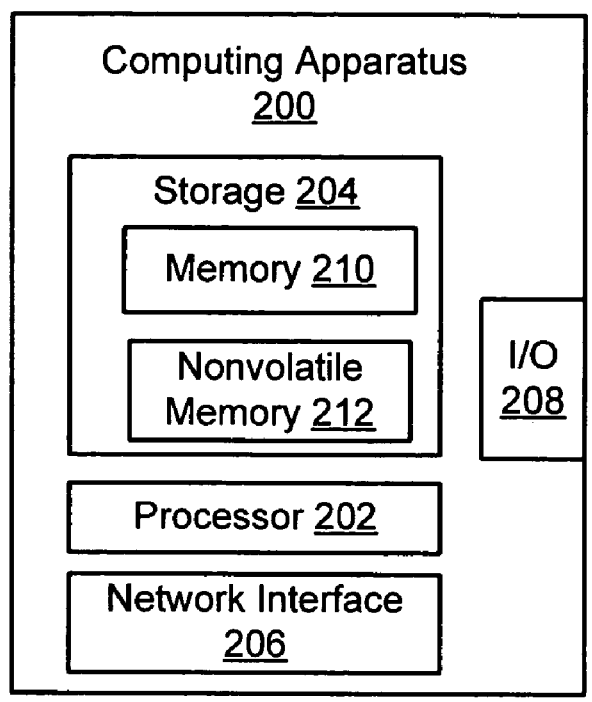
FIG. 2 is a block diagram of the hardware components and interconnections of a computing apparatus in accordance with an example of the invention.

An exemplary computing apparatus 200 is shown in FIG. 2. As an example, host 124, (and in alternative embodiments) cluster 102 and/or cluster 104, could be implemented with an embodiment of the computing apparatus 200. The computing apparatus 200 includes a processor 202 (which may be called a processing device), and in some examples could have more than one processor 202. As an example, the processor may be a PowerPC RISC processor, available from International Business Machines Corporation, or a processor manufactured by Intel Corporation. The processor 202 may run any suitable operating system, for example, Windows 2000, AIX, Solaris™, Linux, UNIX, or HP-UX™. The computing apparatus 200 may be implemented on any suitable computer, for example a personal computer, a workstation, a mainframe computer, or a supercomputer. The computing apparatus 200 also includes a storage 204, a network interface 206, and an input/output 208, which are all coupled to the processor 202. The storage 204 may include a primary memory 210, which for example, may be RAM, and a non volatile memory 212. The non-volatile memory 212 could be, for example, a hard disk drive, a drive for reading and writing from optical or magneto-optical media, a tape drive, non-volatile RAM (NVRAM), or any other suitable type of storage. The storage 204 may be used to store data and application programs and/or other programming instructions executed by the processor. The network interface 206 may provide access to any suitable wired or wireless network or communications link.

II. Operation

In addition to the hardware embodiments described above, other aspects of the invention concern operations for providing protection from data loss on a storage device.

A. Signal-Bearing Media

In the context of FIGS. 1 and 2, the method aspects of the invention may be implemented, for example, by having one or more of the device adapters DA1–8, one or more storage device controllers (for example disk drive controllers), cluster 102, and/or cluster 104 (and/or host 124), execute a sequence of machine-readable instructions, which can also be referred to as code, for carrying out one or more examples of the invention or portions of the invention. These instructions may reside in various types of signal-bearing media. In this respect, some aspects of the present invention concern a programmed product, comprising a signal-bearing medium or signal-bearing media tangibly embodying a program of machine-readable instructions executable by a digital processing apparatus to perform operations for providing protection from data loss on a storage device.

Figure 3:
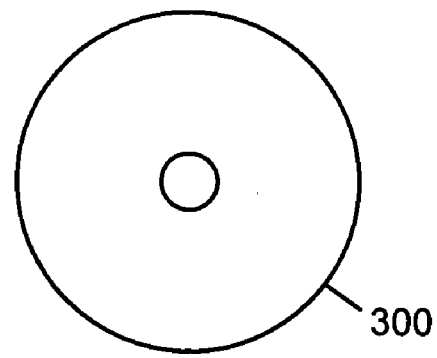
FIG. 3 is an example of a signal-bearing medium in accordance with an example of the invention.

This signal-bearing medium may comprise, for example, RAM 110, RAM 112, NVRAM 114, NVRAM 116, primary memory 210, non-volatile memory 212, and/or firmware in device adapters DA1–8 and/or storage device controllers. Alternatively, the instructions may be embodied in a signal-bearing medium such as the optical data storage disc 300 shown in FIG. 3. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, or elsewhere, the instructions may be stored on any of a variety of machine-readable data storage mediums or media, which may include, for example, a "hard disk drive", a RAID array, a magnetic data storage diskette (such as a floppy disk), magnetic tape, digital optical tape, RAM, ROM, EPROM, EEPROM, flash memory, programmable logic, any other type of firmware, magneto-optical storage, paper punch cards, or any other suitable signal-bearing media including transmission media such as digital and/or analog communications links, which may be electrical, optical, and/or wireless. For example, in some embodiments the instructions or code may be accessible from a file server over a network, or from other transmission media, and the signal bearing media embodying the instructions or code may comprise a transmission media, such as a network transmission line, wireless transmission media, signals propagating through space, radio waves, and/or infrared signals. Alternatively, the signal bearing media may be implemented in hardware logic, for example, an integrated circuit chip, a Programmable Gate Array (PGA), or an Application Specific Integrated Circuit (ASIC). As an example, the machine-readable instructions may comprise microcode, or may comprise software object code, compiled from a language such as "C++".

B. Overall Sequence of Operation

Figure 4A:
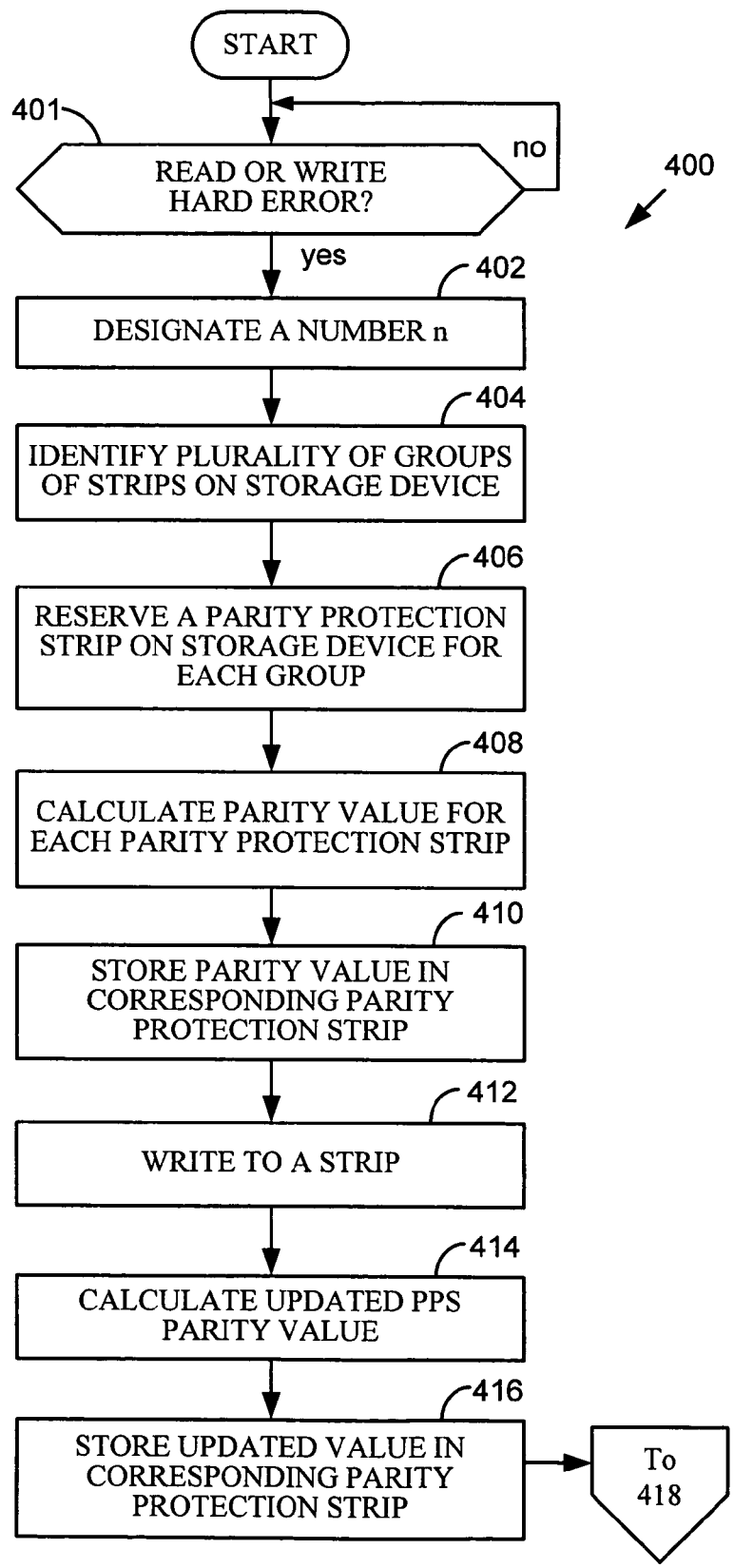
FIGS. 4A, 4B, and 4C are a flowchart of an operational sequence for providing protection from data loss on a storage device in accordance with an example of the invention.
Figure 4B:
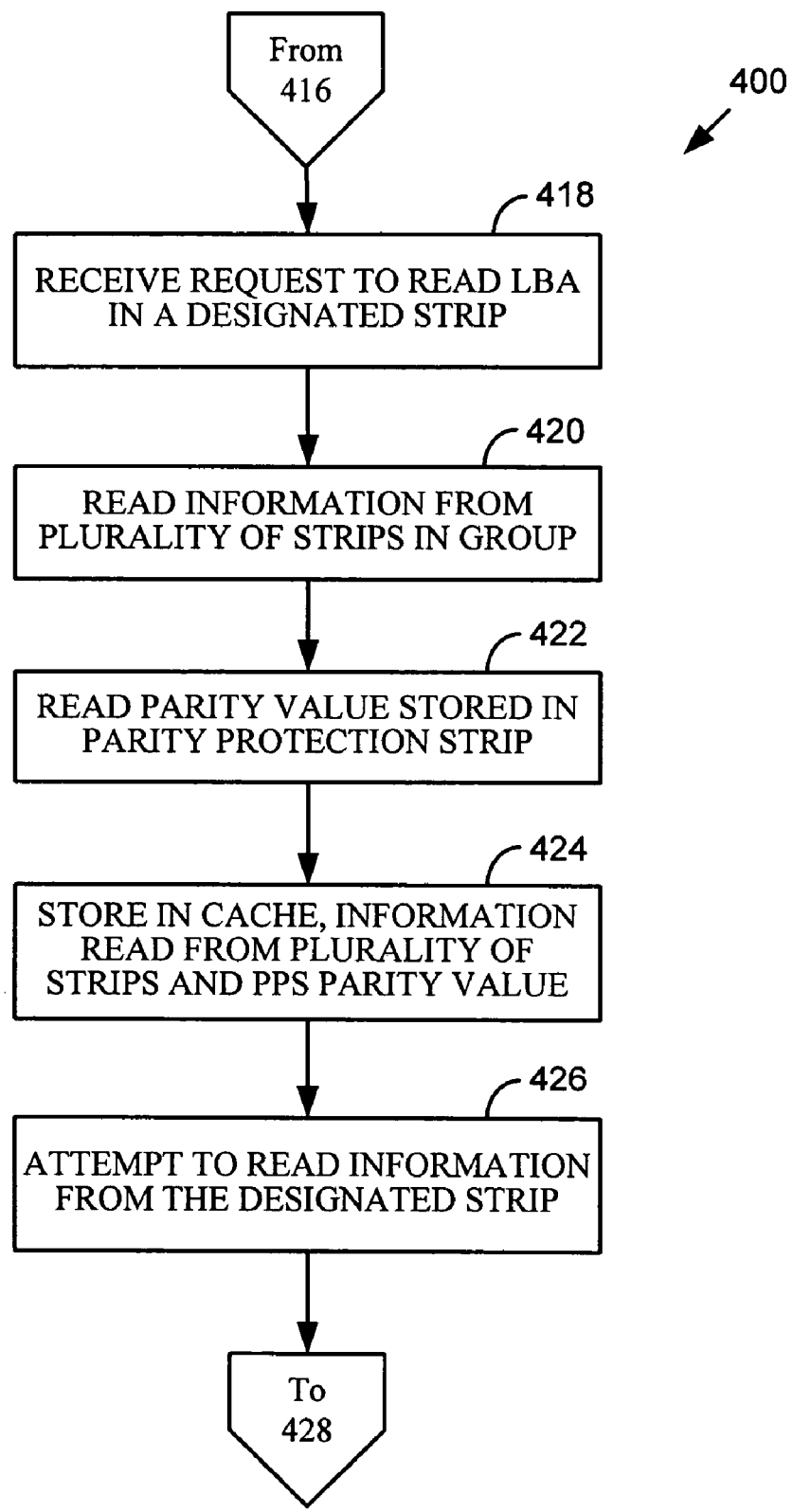
Figure 4C:
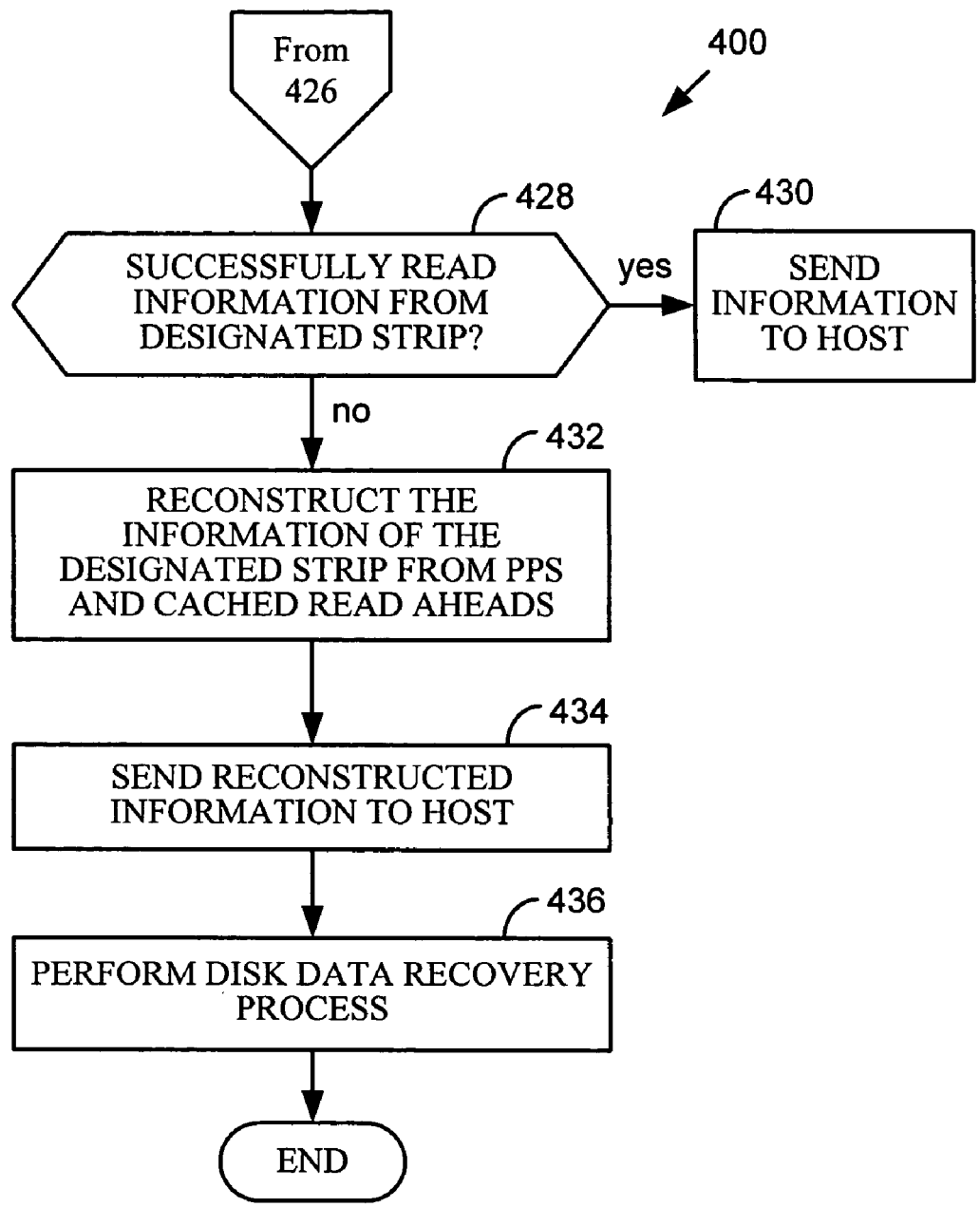

For ease of explanation, but without any intended limitation, exemplary method aspects of the invention are described with reference to the computing system 100 described above and shown in FIG. 1. An example of the method aspect of the invention is illustrated in FIGS. 4A, 4B, and 4C, which show a sequence 400 for a method for providing protection from data loss on a storage device. As an example, the storage device may be a member of a RAID array, or another type of storage device array. As an example, the storage device array may include some, or all, of the storage devices in one or more of the storage device groups 126a–d. As mentioned above, in some examples the storage devices may be hard disk drives.

Operations of the sequence 400 (or portions of the sequence 400) may be performed by one or more of the device adapters DA1–8, storage device controllers, cluster 102, and/or cluster 104 (and/or host 104). Referring to FIG. 4A, sequence 400 may include, and may begin with, operation 401. Operation 401 comprises determining if a hard error has occurred in a RAID array (or other type of storage device array). The hard error may be a read error, a write error, or both. In embodiments of the invention that include operation 401, if a hard error has not occurred in the RAID array, then operation 401 may be repeated until a hard error has occurred, and then the sequence may continue with operation 402. In some other embodiments, operation 401 is not included, and the sequence 400 begins with operation 402. Thus, if operation 401 is included, the other operations of the sequence are performed only if a hard error has occurred in the RAID array. However, the sequence 400, starting with operation 402, may also be performed for a storage device that is not a member of a storage device array.

Sequence 400 may include operation 402, which comprises designating a number n (which may be called a parity protection strip (PPS) number). In operation 404, a plurality of groups of strips may be identified on the storage device, wherein the number of strips in each group is equal to the number n.

The PPS number n advantageously is a tunable quantity:
1) The PPS number n can be set during the installation and/or configuration of the RAID array.
2) The PPS number n can be modified using, for example, mode page settings. For example, if customer data integrity becomes suspect after some incident(s), a PPS number n greater than zero may be used, thereby invoking an embodiment of the invention. In other words, if a hard error occurs in the array, PPS protection may be provided from that point on.
3) The PPS number n can be tuned at the logical volume level. If an array is partitioned into several logical volumes, then each volume may have a different value of n depending on the level of protection desired for a particular class of data.
4) The PPS number can be self tuning by tracking, via a workload monitoring software, the frequency of write updates in a given volume pending actual customer usage. For example, an archival application with very infrequent updates may opt for a very large n value (for example 100) while a very transaction process oriented application may opt for a lower n value (for example 5). However, larger or smaller values for n could be used.

Sequence 400 may also include operation 404, which comprises identifying a plurality of groups of strips on the storage device, wherein the number of strips in a plurality of the groups, (which may include each group), is equal to the number n. In some examples, for a plurality of the groups of strips, (which may include each group of strips), the strips in the group are located at consecutive logical block addresses on the storage device. In other examples the strips in a group could be located at any locations on the storage device. At least one strip on the storage device, (which may include each strip on the storage device), that is not a parity protection strip (discussed below), is in a different stride than at least one of the other strips, (which may include each of the other strips), on the storage device that is not a parity protection strip. Each strip may include one or more LBAs (Logical Block Addresses), which may be used to store, for example, data or parity information. Data stored in at least one stride, (which may include each stride), may, or may not, be related to data stored in other strides. As an example, the data stored in a stride may, or may not, have a sequential relationship with data stored in other strides. As another example, the data stored in a stride may, or may not, include records that are related to records stored in other strides.

Sequence 400 may also include operation 406, which comprises reserving a respective parity protection strip on the storage device, for a plurality of the groups of strips, (which may include each group of strips), identified on the storage device. In some examples the parity protection strips may be reserved in a physically, or logically, contiguous area on the storage device. In other examples, the parity protection strips may be reserved on the storage device interspersed among data and parity blocks. As an example, if n=5, groups of strips and parity protection strips (PPS) may be reserved on a disk as follows:

A first group of strips may include strips 0–4.
A second group of strips may include strips 5–9.
A third group of strips may include strips 10–14.
etc.

Parity protection strips may be stored in an area following the groups of strips, or may be stored after their respective groups, or at some other location on the disk.

Some examples of the invention utilize a parity protection strip within each physical drive of a RAID array, for each group of n strips of (customer) data on the drive. The value of each parity protection strip (PPS) may be computed by XORing RAID strips located at consecutive logical block addresses of the drive. The parity protection strips may be computed and stored in each physical disk drive that is a member of the array. The parity protection strips provide protection for strips belonging to separate strides S0, S1, . . . . Sn–1, in contrast to RAID parity strips (RPS), which are computed, for example, by XORing strips of a single stride striped across the physical disks in the array.

Sequence 400 may also include operation 408, which comprises calculating a parity value for a plurality of parity protection strips, (which may include each parity protection strip), on the storage device, wherein each calculated parity value is a function of the information stored in each of the strips in the corresponding group of strips. Strips that have not yet been written to may store the RAID initialization default value, which, for example, may be zero (a strip of zeros). As an example, the parity values may be calculated by a device adapter for a RAID array, or by individual disk drives. Sequence 400 may also include operation 410, which comprises storing the calculated parity protection strip parity values, in corresponding parity protection strips.

Sequence 400 may also include operation 412, which comprises writing to at least a portion of a designated strip in a group on the storage device. For example, one or more LBAs in the designated strip may be written to. Sequence 400 may also include operation 414, which comprises calculating an updated parity value for the corresponding parity protection strip whenever a write update involves a group strip member (for example, the designated strip). Sequence 400 may also include operation 416, which comprises storing the updated parity value in the corresponding parity protection strip. In alternative embodiments, LBAs in one, two, or more strips in a designated group of strips may be written to one or more times before an updated parity value is calculated. These alternative embodiments include examples where two or more LBAs in the same strip are written to before the updated parity value is calculated, or where the same LBA is written to more than one time before the updated parity value is calculated. As an example, an updated parity value for the parity protection strip corresponding with the designated group may be calculated (either in real time or background mode), after a prescribed number of strips in the designated group have been written to. If the updated parity value is calculated in the background mode, a flag may be used to indicate when, or if, calculation of the updated parity value has been completed.

Referring to FIG. 4B, sequence 400 may also include operation 418, which comprises receiving a request to read information from a LBA in a designated strip in a group on the storage device. Sequence 400 may also include operation 420, which comprises reading information from a plurality of strips in the group corresponding with the designated strip. The plurality of strips in the group corresponding with the designated strip may comprise each of the strips in the group corresponding with the designated strip except the designated strip (and in alternative embodiments could include the designated strip). Sequence 400 may also include operation 422, which comprises reading the parity value stored in the parity protection strip corresponding with the group corresponding with the designated strip. Sequence 400 may also include operation 424, which comprises storing in a cache, the information read from the plurality of strips in the group corresponding with the designated strip, and the parity value read from the corresponding parity protection strip.

The sequence 400 may also include operation 426, which comprises attempting to read the information from the LBA in the designated strip in the group. Referring to FIG. 4C, the sequence 400 may also include operation 428, which comprises determining if the information has been successfully read from the LBA in the designated strip in the group. If the information is successfully read, the sequence 400 may include operation 430, which comprises sending the requested information read from the LBA in the designated strip in a group on the storage device to a host or cluster (that requested the information). If the information is not successfully read, unsuccessfully reading the information may be described as failing to read the information from the LBA in the designated strip in the group. In some examples, failing to read the information may comprise failing to receive the information from the LBA in the designated strip within a prescribed period of time. Also, in some examples of the invention, the reading information from the plurality of strips operation, and the reading the parity value operation, and the reconstructing operation (discussed below), are performed only if it is determined that there has been a failure to read the information.

If the information is not successfully read from the LBA in the designated strip in the group, then the sequence 400 may also include operation 432, which comprises reconstructing the value of the designated strip by performing a Boolean operation on the information read from the plurality of strips in the group corresponding with the designated strip, and the parity value read from the corresponding parity protection strip. As an example, the Boolean operation may be the XOR (exclusive OR) operation. The operation of reconstructing the value of the designated strip may include reading from the cache, the information read from the plurality of strips in the group corresponding with the designated strip, and the parity value read from the corresponding parity protection strip. In some examples, the reconstructing operation may be completed before expiration of a device adapter timer period, to preempt a disk data recovery process. In alternative embodiments, the information read from the plurality of strips in the group corresponding with the designated strip, and the parity value read from the corresponding parity protection strip, are used for reconstructing the value of the designated strip, but are not first stored in, or read from, the cache. The storing operation and the reconstructing operation, and one or more of the other operations described herein, may be performed during a RAID rebuild. Reconstructing the designated strip in accordance with examples of the invention permits reconstructing the strip faster than the time that would be required to reconstruct a lost strip using RAID parity reconstruction, wherein strips are read from each of the surviving drives in a stride, and are then XORed to recover the missing strip. Sequence 400 may also include operation 434, which comprises sending information from the reconstructed strip to a host (or cluster).

Sequence 400 may also include operation 436, which comprises performing a disk data recovery process (DRP). In some examples the data recovery process may be performed in parallel (during the same period of time), while other operations of the sequence 400 are performed.

C. Additional Discussion

Figure 5:
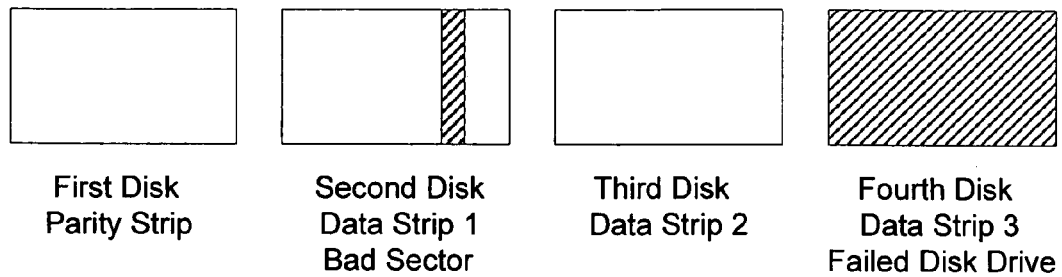
FIG. 5 is a depiction of an array of disks having a failed disk, and a bad sector on another disk.

Some examples of the invention may be described as providing autonomic protection against RAID data strip loss. More specifically, some examples of the invention prevent customer data loss known as a strip loss, which occurs most often during a RAID rebuild after an array has had one or more disk drive failures equal to the disk drive fault tolerance of the RAID code. FIG. 5 shows a 3+P RAID 5 array that includes a first disk that contains a parity strip, a second disk that contains data strip 1, a third disk that contains data strip 2, and a fourth disk that contains data strip 3. If the fourth disk drive that contains data strip 3 is no longer available to the array, and if PPS protection in accordance with an example of the invention is not provided, the array, as shown, may have a strip loss due to a bad sector on the second disk which contains strip 1. Some examples of the invention provide a quicker method of reconstructing the information on a strip (such as strip 1 in FIG. 5) from a drive that may have a poorly written track or some other localized problem (e.g. excessive off-track disturbance at a particular physical location on the drive), which frequently causes the device adapter to resort to a preemptive reconstruct of the data.

Some examples of the invention provide protection against data loss, in an efficient manner with respect to available storage (by using less usable disk storage capacity). The capacity overhead of using PPS protection depends inversely on the number n, of strips used to calculate each PPS. From a practical perspective, n should usually be greater than or equal 3, so that the protection is at least more efficient than mirroring. The final choice of n may depend on the application and the level of data robustness desired. For a comparison, consider various RAID arrays consisting of 6 physical disks. Referring to Table 1 below, a 6 disk RAID 5 with PPS for various n values compares favorably to a 6 disk RAID DP (4+2P) or a 6 disk RAID 51 2×(2+P).

TABLE 1

| | % storage capacity consumed |
|---|---|
| RAID 5 w PPS | 5% for n = 20, |
| | 10% for n = 10, |
| | 20% for n = 5 |
| RAID DP (4 + 2P) | 33% |
| RAID 51 | 66% |

Figure 6:
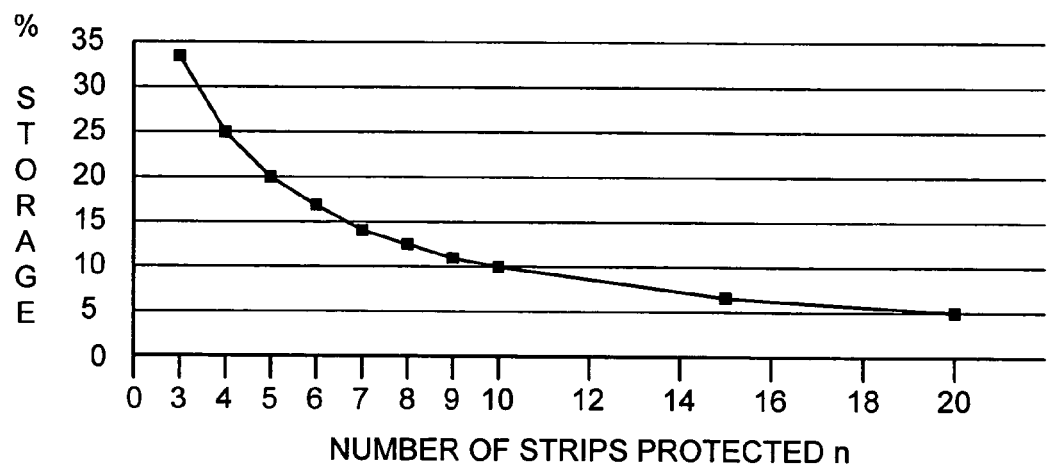
FIG. 6 is a graph of PPS overhead vs. the number of strips protected in accordance with an example of the invention.

FIG. 6 is a graph showing the strip overhead, as a function of the number n of strips protected, when PPS protection is used. The vertical axis represents the percentage of the storage capacity of a disk drive (or other storage device)

consumed, and the horizontal axis represents the number n of strips protected. FIG. 6 illustrates that the PPS overhead decreases as n increases.

Some examples of the invention provide fast retrieval of data if a drive, which may be a member of an array of drives, has a media error. The drive can be instructed to perform a read to cache of not only a target strip in the array, but also of the other strips in the same group of strips as the target strip, and of the PPS for the group. If the drive finds a permanent media error in the target strip, the reconstruction can proceed immediately by XORing the read ahead strips. This procedure is much faster than reading strips across each of the physical disks in the array and performing a recovery using the RAID parity. Using the RAID parity to reconstruct a target strip in a 7+P array can take a significant amount of time, with most of the time spent striping across each of the physical disks and subsequently retrieving the data strip in each drive. In contrast, reconstructing the target strip by XORing the cached strips in the group and the PPS strip is relatively fast.

If a disk drive (which may be in an array) has a media error, some examples of the invention provide a potentially faster and more predictable data recovery process than a disk's data recovery process (DRP). Typical DRP steps include many different sequential attempts to read the target data, such as retrying to read the data on a second or third revolution, positioning the head slightly offtrack on either side of nominal in case the written track was off track, changing a lens focal length, etc. The overall number of DRP steps varies from disk drive to disk drive, but typically the total time required to perform all of the steps can take up to several minutes. Due to IO performance considerations, after a device adapter timer counter runs out, the device adapter typically will force a recovery of the data via RAID reconstruction from the remaining array members. In contrast, with some examples of the invention, rather than waiting until the timer runs out, the DRP process is pre-empted by the PPS recovery, wherein the strips in the group with the target strip, and the associated PPS strip, (previously stored in a cache), are read from the cache and XORed to produce the target strip.

Examples of the invention may be implemented in conjunction with a higher RAID code (a RAID code providing additional redundancy), to provide additional protection from data loss. As an example, the PPS data recovery procedure could serve as a backup in instances where a strip loss occurs after multiple disk failures in an array using a higher RAID code, and in this case a large value of the PPS number n could be used (although a smaller value of n could also be used).

An example of an implementation of the invention, using, for simplicity a (2+P) RAID 5 array consisting of 3 disks, is shown in FIG. 7. A PPS strip is stored for each group of n strips on each member disk. Like metadata that is often stored by a RAID adapter on array disks, as shown in FIG. 7, an area in each of the disk drives may be reserved for saving each successive PPS. This area may be physically interspersed amongst the available data and parity blocks, or, the PPSs may be located in a logically or physically contiguous area on the disk. The member disks also store RAID parity strips (RPS), for example RPS 10 and RPS 11 on member disk 1, RPS22 and RPS 23 on member disk 2, and RPS34 and RPS35 on member disk 3. The RAID parity strips may be used for reconstructing a strip in a stride, by reading strips across the drives in the array. In FIG. 7, stride S0 consists of RPS10, strip 20, and strip 30. Similarly, stride S1 consists of RPS11, strip 21 and strip 31. Likewise, stride S2 consists of strip 12, RPS22, and strip 32. In FIG. 7, the stretch distance, which is the number of strides before the RAID parity strips are rotated to the next disk, is two. However, any stretch distance could be used with the invention.

Figure 8:
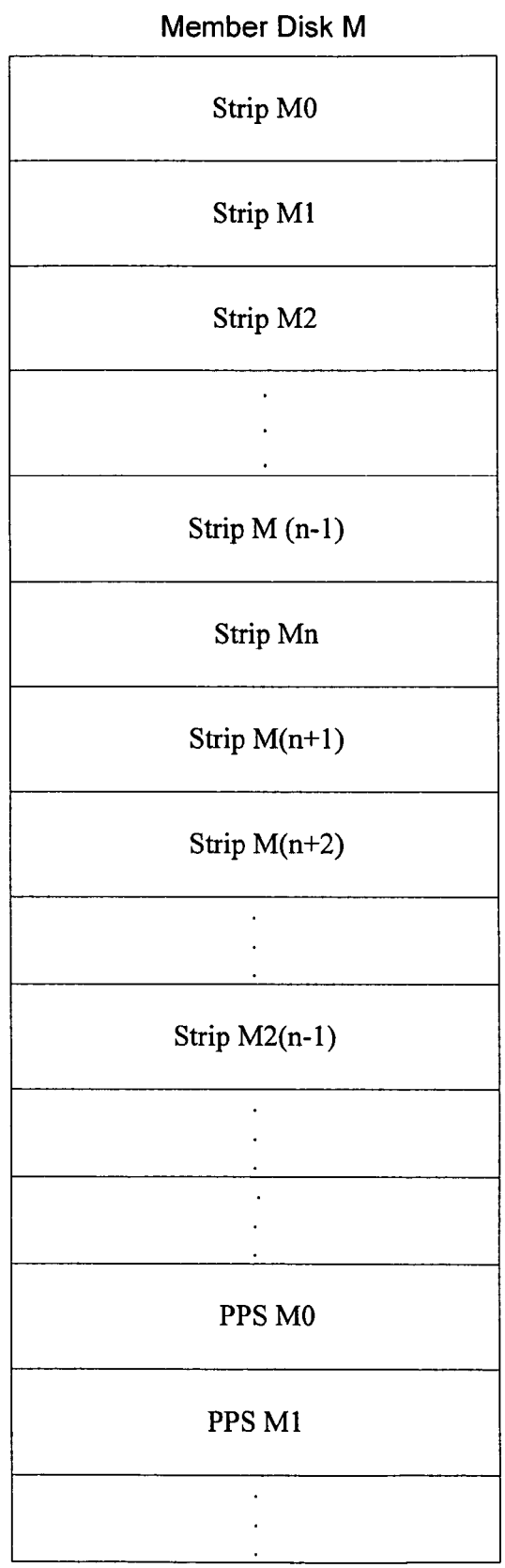
FIG. 8 is a depiction of strips on a disk drive in accordance with an example of the invention.

FIG. 8 shows PPS storage on n successive strips on a disk M, which may be a member of a RAID array. Each strip in the disk M is a component of a separate data stride in the array, and may be a parity strip for the associated stride. An update to any strip in the group corresponding with a PPS may trigger an update to the PPS. As an example, PPSs may be generated at the disk drive level using a disk drive's XOR engine, and then the PPSs may be stored on the disk. A PPS may be updated in real time, or in background mode. In either mode, in some embodiments, a PPS is not updated until a predetermined subset of strips in the corresponding group of strips have been updated. A counter may be used to determine when the PPS should be updated. Delaying the updating of a PPS in this fashion would reduce the frequency of updating the PPS for a group of strips, but should be weighed against the fact that the strip protection is not available until the PPS update is completed. If the parity value is updated in the background mode, a flag may be used to indicate when, or if, updating of the parity value has been completed. Calculation of PPS values may be described as follows (wherein XOR operation="+").

PPS=XOR of n strips.

PPS M0=Strip M0 "+" Strip M1 "+" Strip M2 "+" . . . "+" Strip M(n−1).

PPS M1=Strip Mn "+" Strip M(n+1) "+" Strip M(n+2) "+" . . . "+" Strip M2(n−1).

etc. . . .

PPS M0 and PPS M1 may be written to a reserved area on member disk M.

Figure 9:
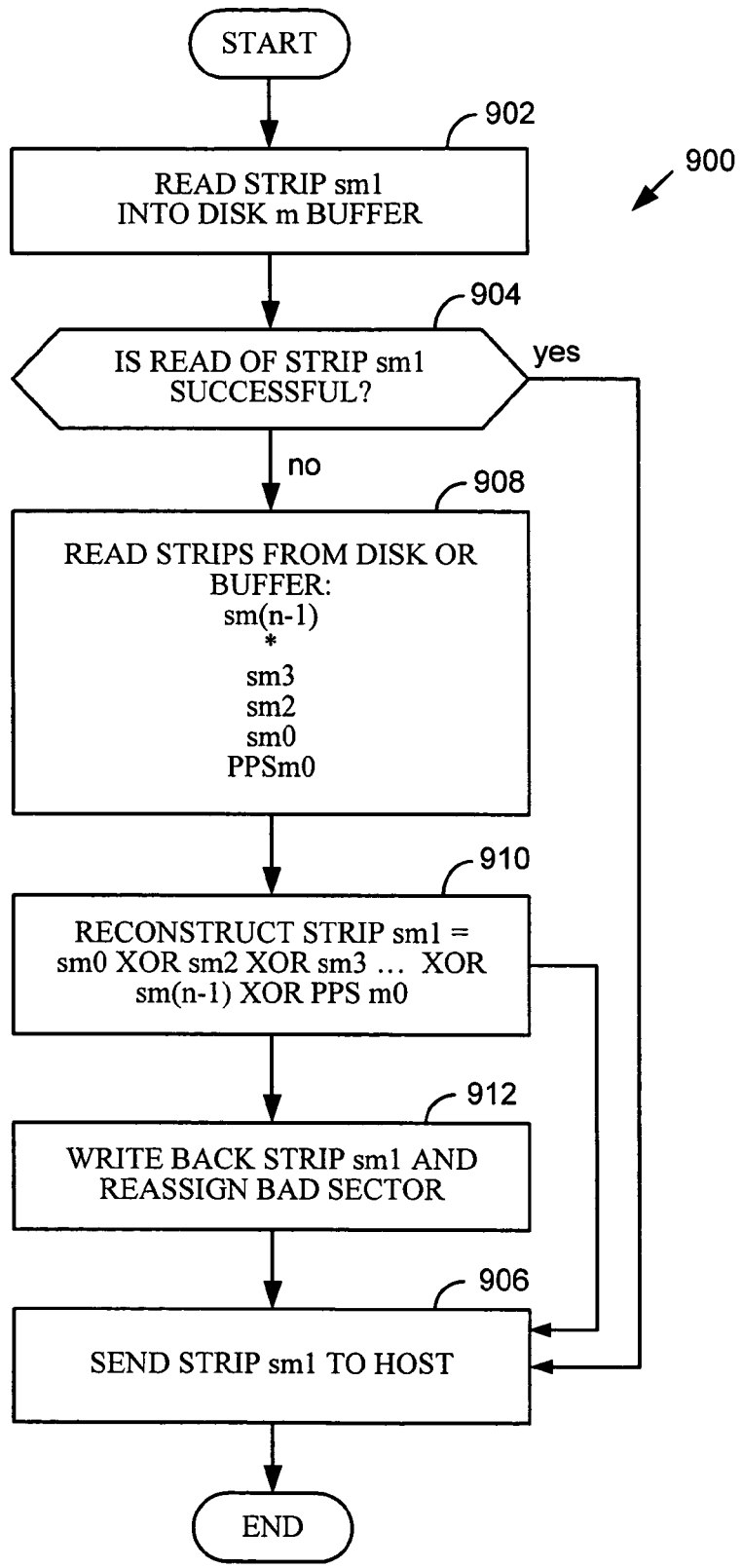
FIG. 9 is a flowchart of an operational sequence for providing protection from data loss on a storage device in accordance with an example of the invention.

FIG. 9 is a flow chart showing a sequence 900 for processing of a successful read, and a failed read, of a strip sm1 from disk m. For simplicity, disk data recovery via DRP is not shown, but may be run in parallel to the PPS recovery, or the PPS recovery may be inserted as one of the first steps in the DRP, or the DRP may be omitted. As shown in FIG. 9, the failure to read sm1 invokes a read into a cache (a buffer) of the associated strips and PPS, and then sm1 is computed by XORing the retrieved material. More specifically, sequence 900 may include operation 902, which comprises attempting to read strip sm1 into a buffer for disk m. Sequence 900, may also include operation 904, which comprises determining if the read of sm1 is successful. If the read is successful, sequence 900 may also include operation 906, which comprises sending strip sm1 to a host. If the read of sm1 is not successful, sequence 900 may also include operation 908, which comprises reading strips sm(n−1), . . . sm3, sm2, sm0, and the corresponding parity protection strip PPS m0 from the disk, or the buffer (if the strips were read ahead). Sequence 900 may also include operation 910, which comprises calculating the value of strip sm1, which equals sm0 XOR sm2 XOR sm3 XOR . . . XOR sm(n−1) XOR PPS m0, to reconstruct strip sm1. Sequence 900 may also include operation 912, which comprises writing sm1, and reassigning the bad sector. Operation 906, wherein the reconstructed value of sm1 in sent to the host, may also be performed after operation 912.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A signal bearing medium tangibly embodying a program of machine-readable instructions executable by a digital processing apparatus to perform operations for providing protection from data loss on a storage device, the operations comprising:

designating a number n, wherein the number n is initially designated zero, and responsive to the occurrence of a hard error, the number n is designated a value greater than zero;

identifying a plurality of groups of strips on the storage device, wherein a number of strips in a plurality of the groups is equal to the number n;

reserving a respective parity protection strip on the storage device, for a plurality of the groups of strips identified on the storage device;

calculating a parity value for a plurality of parity protection strips on the storage device, wherein each calculated parity value is a function of information stored in each of the strips in the corresponding group of strips;

storing the calculated parity protection strip parity values, in corresponding parity protection strips on the storage device; and monitoring the frequency of write updates on the storage device, and automatically tuning the number n, as a function of the frequency of the write updates;

and wherein the storage device is a member of an array of storage devices, and wherein for each group identified on the storage device, each strip in the group is in a different stride in the array than the other strips in the group.

2. The signal bearing medium of claim 1, wherein the operations further comprise:

receiving a recluest to read information in a designated strip in one of the groups on the storage device;

responsive to receiving the request to read information in the designated strip, reading information in all of the other strips in the group corresponding with the designated strip and reading the parity value stored in the parity protection strip corresponding with the group corresponding with the designated strip;

and wherein the operations of reading information in all of the other strips in the group, and reading the parity value, are performed whether or not there is a failure to read the requested information in the designated strip, to permit quickly reconstructing the requested information in the designated strip if necessary.

3. The signal bearing medium of claim 2, wherein the array of storage devices is a RAID array, and at least one strip in at least one the groups on the storage device is a parity strip for a stride in the RAID array.

4. The signal bearing medium of claim 2, wherein the operations further comprise:

writing to at least a portion of a specified strip in a group on the storage device; and calculating an updated parity value for the parity protection strip corresponding with the group corresponding with the specified strip.

5. The signal bearing medium of claim 2, wherein the operations further comprise:

writing to an LBA in any of a plurality of strips in a designated group;

again writing to an LBA in any of a plurality of strips in the designated group; and calculating an updated parity value for the parity protection strip corresponding with the designated group, after a prescribed number of writes to at least one strip in the designated group.

6. The signal bearing medium of claim 4, wherein the operations further comprise:

receiving a request to read information from an LBA in a designated strip in one of the groups on the storage device;

attempting to read the information from the LBA in the designated strip in the group;

reading information from a plurality of the strips in the group corresponding with the designated strip;

reading the parity value stored in the parity protection strip corresponding with the group corresponding with the designated strip; and reconstructing the value of the designated strip by performing a Boolean operation on the information read from the plurality of strips in the group corresponding with the designated strip, and the parity value read from the corresponding parity protection strip.

7. The signal bearing medium of claim 6, wherein the reconstructing operation is performed during a RAID rebuild.

8. The signal bearing medium of claim 6, wherein the operations further comprise failing to read the information from the LBA in the designated strip in the group.

9. The signal bearing medium of claim 8, wherein the failing to read operation comprises failing to receive the information from the LBA in the designated strip within a prescribed period of time, and wherein the failing to read operation is performed prior to performing the reading information from the plurality of strips operation, and the reading the parity value operation, and the reconstructing operation.

10. The signal bearing medium of claim 1, wherein the operations further comprise:

receiving a request to read information from an LBA in a designated strip in a group on the storage device;

reading information from a plurality of the strips in the group corresponding with the designated strip;

reading the parity value stored in the parity protection strip corresponding with the group corresponding with the designated strip; and storing in a cache, the information read from the plurality of strips in the group corresponding with the designated strip, and the parity value read from the corresponding parity protection strip.

11. The signal bearing medium of claim 10, wherein the storing operation is performed during a RAID rebuild.

12. The signal bearing medium of claim 10, wherein the plurality of strips in the group corresponding with the designated strip comprises each of the strips in the group corresponding with the designated strip except the designated strip.

13. The signal bearing medium of claim 10, wherein the operations further comprise:

attempting to read the information from the LBA in the designated strip in the group; and reconstructing the value of the designated strip by performing a Boolean operation on the information read from the plurality of strips in the group corresponding with the designated strip, and the parity value read from the corresponding parity protection strip.

14. The signal bearing medium of claim 13, wherein the operations further comprise failing to read the information from the LBA in the designated strip in the group.

15. The signal bearing medium of claim 14, wherein the failing to read operation comprises failing to receive the information from the LBA in the designated strip within a prescribed period of time.

16. The signal bearing medium of claim 13:
wherein the reconstructing operation further comprises reading from the cache, the information read from the plurality of strips in the group corresponding with the designated strip, and the parity value read from the corresponding parity protection strip;
and wherein the reconstructing operation is completed before expiration of a device adapter timer period, to preempt a disk data recovery process.

17. The signal bearing medium of claim 2, wherein the operations further comprise performing a disk data recovery process.

18. The signal bearing medium of claim 17, wherein for a plurality of the groups of strips, the strips in the group are located at consecutive logical block addresses on the storage device.

19. The signal bearing medium of claim 18, wherein the parity protection strips are reserved in a physically contiguous area on the storage device.

20. The signal bearing medium of claim 18, wherein the parity protection strips are reserved on the storage device interspersed among data and parity blocks.

21. The signal bearing medium of claim 1, wherein the number n is designated during configuration of a RAID array.

22. The signal bearing medium of claim 1, wherein the number n is modifiable via page mode settings.

23. The signal bearing medium of claim 1, wherein the number n is tunable at a logical volume level.

24. The signal bearing medium of claim 4, wherein the operation of calculating an updated parity value is performed only after a prescribed number of strips in the group corresponding with the specified strip have been written to.

25. The signal bearing medium of claim 1:
wherein the array is a RAID array;
and wherein the operations further comprise determining if a data strip loss has occurred in the RAID array;
and wherein the operations of claim 1 are performed only if a data strip loss has occurred in the RAID array.

26. A method for providing protection from data loss on a storage device, comprising the following operations:
designating a number n, wherein the number n is initially designated zero, and responsive to the occurrence of a hard error, the number n is designated a value greater than zero;
identifying a plurality of groups of strips on the storage device, wherein a number of strips in a plurality of the groups is equal to the number n;
reserving a respective parity protection strip on the storage device, for a plurality of the groups of strips identified on the storage device;
calculating a parity value for a plurality of parity protection strips on the storage device, wherein each calculated parity value is a function of information stored in each of the strips in the corresponding group of strips;
storing the calculated parity protection strip parity values, in corresponding parity protection strips on the storage device;
monitoring the frequency of write updates on the storage device, and automatically tuning the number n, as a function of the frequency of the write updates;
receiving a request to read information in a designated strip in one of the groups on the storage device;
responsive to receiving the request to read information in the designated strip, reading information in all of the other strips in the group corresponding with the designated strip and reading the parity value stored in the parity protection strip corresponding with the group corresponding with the designated strip;
and wherein the operations of reading information in all of the other strips in the group, and reading the parity value, are performed whether or not there is a failure to read the requested information in the designated strip, to permit quickly reconstructing the requested information in the designated strip if necessary;
and wherein the storage device is a member of an array of storage devices, and wherein for each group identified on the storage device, each strip in the group is in a different stride in the array than the other strips in the group.

* * * * *